(12) United States Patent
Obitts et al.

(10) Patent No.: US 9,357,841 B2
(45) Date of Patent: Jun. 7, 2016

(54) LATCH ASSEMBLY FOR SECURING TRACKS AND DIVIDERS TO A FRONT RAIL

(71) Applicants: Shane Obitts, Elyria, OH (US); Gerald Matthew Szpak, Brecksville, OH (US)

(72) Inventors: Shane Obitts, Elyria, OH (US); Gerald Matthew Szpak, Brecksville, OH (US)

(73) Assignee: Fasteners For Retail, Inc., Twinsburg, OH (US)

( * ) Notice: Subject to any disclaimer, the term of this patent is extended or adjusted under 35 U.S.C. 154(b) by 0 days.

(21) Appl. No.: 14/247,531

(22) Filed: Apr. 8, 2014

(65) Prior Publication Data

US 2014/0305895 A1  Oct. 16, 2014

Related U.S. Application Data

(60) Provisional application No. 61/809,720, filed on Apr. 8, 2013.

(51) Int. Cl.
*A47G 29/087* (2006.01)
*A47F 5/00* (2006.01)
*A47B 57/58* (2006.01)

(52) U.S. Cl.
CPC .............. *A47B 57/58* (2013.01); *A47F 5/005* (2013.01); *Y10T 29/49876* (2015.01)

(58) Field of Classification Search
CPC ...... A47B 57/58; A47B 55/00; A47B 57/583; A47B 57/585; A47B 57/586; A47B 65/10; A47B 65/15; A47B 96/04; A47B 88/20; A47F 5/005; A47F 5/00; A47F 5/0068; A47F 3/002; A47F 5/0025; A47F 7/144; A47F 5/132; A47F 5/0043; Y10T 29/49876
USPC .............. 211/119.003, 59.2, 184; 108/60, 61; 292/1, 80, 81, 87, DIG. 38; 29/453

See application file for complete search history.

(56) References Cited

U.S. PATENT DOCUMENTS

| | | | | | |
|---|---|---|---|---|---|
| 3,501,019 | A | * | 3/1970 | Armstrong | A47B 57/58 108/61 |
| 3,559,815 | A | * | 2/1971 | Huddleston | A47F 5/005 211/184 |
| 3,746,295 | A | * | 7/1973 | Stepanek | A47F 5/0068 248/447.2 |
| 3,750,894 | A | * | 8/1973 | Jensen | A47F 5/005 211/184 |
| 3,872,976 | A | * | 3/1975 | Moore | A47F 5/005 211/184 |
| 3,893,739 | A | * | 7/1975 | Bernard | A47B 57/585 211/184 |
| 4,606,464 | A | * | 8/1986 | Jordan | A47L 15/503 211/184 |
| 4,712,694 | A | * | 12/1987 | Breslow | A47F 5/005 108/61 |
| 4,736,997 | A | * | 4/1988 | Besore | A47F 5/005 108/108 |
| 5,217,124 | A | * | 6/1993 | Stone | A47F 5/005 108/61 |
| 5,275,297 | A | * | 1/1994 | Dokoupil | A47B 57/586 108/61 |

(Continued)

*Primary Examiner* — Jennifer E Novosad
(74) *Attorney, Agent, or Firm* — Fay Sharpe LLP (57) ABSTRACT

A latch or connector assembly that is adapted to attach a track to a rail along a platform of a merchandising shelf assembly. The connector assembly includes an adapter having a first end and an opposite second end such that the first end is adapted to be attached to the track and the second end is configured to be selectively attached to the rail. The adapter includes a first arm and a second arm, the first arm is spaced from a second arm such that the first arm can be resiliently biased relative to the second arm. An attachment member extends from the first arm and is configured to selectively connect to the rail. A press surface is configured to be pressed by a user to bias the first arm relative to the second arm to selectively connect the attachment member to the rail.

16 Claims, 5 Drawing Sheets

(56) References Cited

U.S. PATENT DOCUMENTS

| | | | |
|---|---|---|---|
| 6,299,004 B1 * | 10/2001 | Thalenfeld | A47F 1/12 211/184 |
| 6,598,754 B2 * | 7/2003 | Weiler | A47B 57/583 211/184 |
| 7,216,770 B2 | 5/2007 | Mueller et al. | |
| 7,395,938 B2 * | 7/2008 | Merit | A47F 5/005 211/184 |
| 7,641,057 B2 | 1/2010 | Mueller et al. | |
| 7,784,623 B2 | 8/2010 | Mueller et al. | |
| 7,934,609 B2 * | 5/2011 | Alves | A47F 5/005 211/184 |
| 7,971,735 B2 | 7/2011 | Mueller et al. | |
| 8,069,998 B2 * | 12/2011 | Thomas | A61B 19/0256 206/370 |
| 8,177,076 B2 | 5/2012 | Rataiczak, III et al. | |
| 8,342,340 B2 | 1/2013 | Rataiczak, III et al. | |
| 8,496,126 B2 | 7/2013 | Mueller et al. | |
| 8,739,984 B2 * | 6/2014 | Hardy | A47F 1/126 211/119.003 |
| 2001/0002659 A1 * | 6/2001 | Bada | A47B 57/583 211/59.2 |
| 2003/0141265 A1 * | 7/2003 | Jo | A47F 1/126 211/59.3 |
| 2004/0124161 A1 * | 7/2004 | Lau | G11B 33/0483 211/40 |
| 2005/0044765 A1 * | 3/2005 | Ahlund | G09F 3/204 40/649 |
| 2005/0139560 A1 * | 6/2005 | Whiteside | A47F 5/005 211/119.003 |
| 2006/0260518 A1 * | 11/2006 | Josefsson | A47F 5/005 108/61 |
| 2007/0108146 A1 * | 5/2007 | Nawrocki | A47B 55/02 211/119.003 |
| 2008/0203256 A1 * | 8/2008 | Medcalf | A47F 5/005 248/231.81 |
| 2012/0006773 A1 * | 1/2012 | Mueller | A47F 1/126 211/59.3 |
| 2013/0020270 A1 * | 1/2013 | Valiulis | A47F 5/005 211/59.2 |
| 2013/0200019 A1 | 8/2013 | Hardy et al. | |
| 2014/0305895 A1 * | 10/2014 | Obitts | A47F 5/005 211/182 |

* cited by examiner

LATCH ASSEMBLY FOR SECURING TRACKS AND DIVIDERS TO A FRONT RAIL

This application claims the benefit of Provisional Application Ser. No. 61/809,720 which was filed on Apr. 8, 2013. The entire content of that application is incorporated hereinto by reference.

BACKGROUND

The present disclosure relates to a latch assembly for merchandising shelf systems. It finds particular application in conjunction with a latch for securing tracks or dividers to a front rail of a merchandising shelf system, and will be described with particular reference thereto. However, it is to be appreciated that the present exemplary embodiment is also amenable to other like applications.

Merchandising shelf assemblies are generally arranged to stock, store or display various products or merchandise in a desirable way. Many stores sell various retail items that have various geometric shapes and it is desirable to provide shelf assemblies that are individually configurable to stock, store or display merchandise in arrangements such that the goods are readily accessible to potential purchasers. The shelf assemblies can include forward feed assemblies in which merchandise for sale is placed but can also include dividers that separate the products into columns on the shelf. Both the divider and the forward feed assembly can be connected to a rail or support track placed on the shelf. The rail is often a front rail.

Shelf dividers neatly separate multiple products on a single shelf into columns while pusher tracks urge merchandise forward on the shelf. Dividers and pusher tracks are used to increase sales and enhance presentation so that a shelf looks fully stocked. Multiple sizes and styles are available. In many instances, the pusher tracks and dividers, which can both be termed cooperating members, are mounted to the shelf by an elongated mounting member, such as a rail. The rail can include a vertically oriented wall positioned along a front edge of the shelf to retard product from falling off the shelf. The rail can also include an attachment profile positioned adjacent to the shelf front edge that runs lengthwise along the shelf. Such tracks and dividers, i.e. cooperating members, are adapted to connect to the rail along cooperating attachment profiles.

Generally, the cooperating members can be mounted to rails by positioning the member at one end of the rail and sliding the member along the attachment profile of the rail into a desired position in relation to the length of the shelf. The rail is adapted to mount the cooperating member (track or divider) at a desired location on the shelf and retard movement of the track or divider thereon while also allowing a merchant to adjust the location of the divider or track along the shelf.

There are different attachment profiles that are associated with various existing rails and existing tracks and dividers for merchandising. A problem can exist when a user desires to remove a particular track or divider from the rail or to re-position same along the rail. Such removal or re-positioning may require the removal of other tracks or dividers mounted to the rail. Additionally, the known tracks or dividers are susceptible to being moved out of place due to the presence of side loads imposed thereon.

Therefore, there remains a need to provide an assembly that would assist a merchant to attach, remove or reconfigure individual cooperating members along a longitudinal axis of a rail of a merchandising shelf without having to remove or reconfigure other cooperating members located along the same rail.

BRIEF DESCRIPTION

In one embodiment, the present disclosure pertains to a connector assembly or latch assembly that is adapted to attach a cooperating member to a rail, along a merchandising shelf. The connector assembly comprises a latch member having a first end and an opposite second end such that the first end is adapted to be mounted or attached to the cooperating member and the second end is configured to be selectively attached to the rail. The adapter includes a first arm and a second arm with the first arm being spaced from the second arm such that the first arm can be resiliently biased relative to the second arm. An attachment member extends from the first arm and is configured to selectively connect to the rail. A contact surface is configured to be pressed by a user to bias the first arm relative to the second arm to selectively disconnect the attachment member from the rail.

In another embodiment, a connector assembly that is adapted to attach a cooperating member to a rail along a platform of a merchandising shelf assembly comprises an adapter including a first end and an opposite second end such that the first end is adapted to be attached to the cooperating member and the second end is configured to be selectively attached to the rail. The adapter includes a first arm and a second arm. The first arm is spaced from the second arm such that the first arm is movable in relation to the second arm. An attachment member extends from the first arm and is configured to selectively connect to the rail. A press surface is defined on the first arm and is configured to be pressed by an associated user to bias the first arm relative to the second arm to selectively connect the attachment member to the rail.

In accordance with a further embodiment of the present disclosure, a connector assembly that is adapted to attach a cooperating member to a rail along a platform of a merchandising shelf assembly comprises an adapter including a first end and an opposite second end such that the first end is adapted to be attached to the cooperating member and the second end is configured to be selectively attached to the rail. The adapter includes a first arm and a second arm. The first arm is spaced from the second arm such that the first arm can be resiliently biased relative to the second arm. A base platform extends from the second arm and is configured to abut the rail. An attachment member extends from the first arm and is configured to selectively connect to the rail. The merchandising shelf assembly comprises the shelf platform with a portion of the cooperating member and the rail configured to be positioned along a front edge of the shelf platform. The rail includes a first side adapted to be viewed by associated customers and an opposite second side with an elongated member such that the attachment member is configured to attach the track along the second side of the rail.

In accordance with a yet further embodiment of the present disclosure, a method is provided for connecting a track or divider to a rail on a shelf platform with an adapter. The method comprises attaching an adapter within a channel of the track or divider. The adapter includes a first arm spaced from the second arm, wherein the first arm is configured to move relative to the second arm and an attachment member extends from an end of the first arm. The first arm is biased towards the second arm. The adapter is positioned on the shelf platform, along with the track or divider adjacent to a rear side of the rail, such that the attachment member of the first arm is aligned with an elongated member extending from the rear side of the rail. The first arm is biased away from the second arm such that the attachment member is received within a spaced defined by the elongated member and the second side of the rail and an edge of the elongated member at least partially frictionally abuts an abutment surface along the first arm.

BRIEF DESCRIPTION OF THE DRAWINGS

The present disclosure may take form in certain parts and arrangements of parts, several embodiments of which will be described in detail in this specification and illustrated in the accompanying drawings which form a part hereof and wherein.

DETAILED DESCRIPTION

It is to be understood that the detailed figures are for purposes of illustrating exemplary embodiments of the present disclosure only and are not intended to be limiting. Additionally, it will be appreciated that the drawings are not to scale and that portions of certain elements may be exaggerated for the purpose of clarity and ease of illustration.

Figure 1:
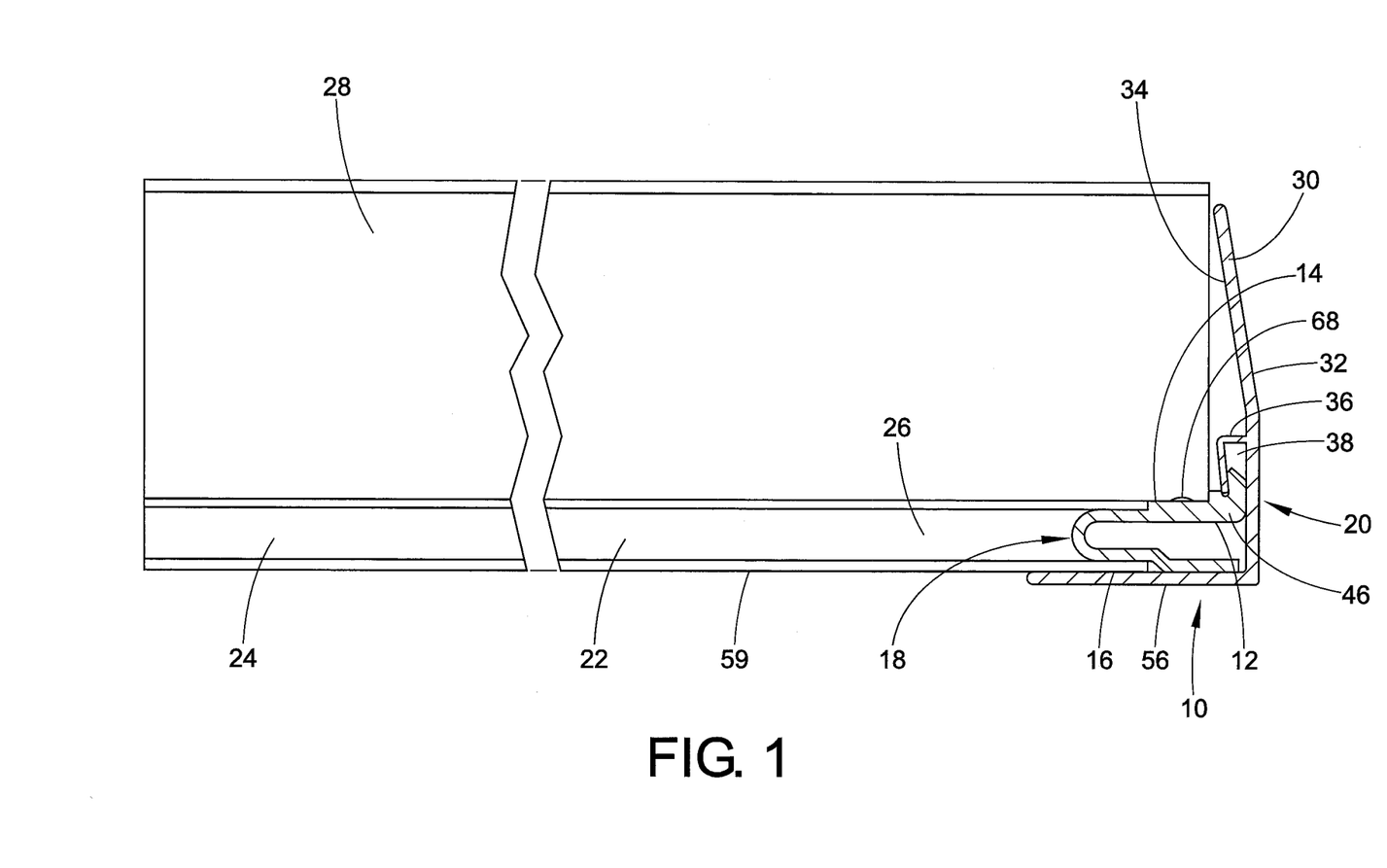
FIG. 1 is a side elevational view, in cross-section, of a latch assembly including a combination track and divider connected to a rail by an adapter according to one embodiment of the present disclosure.

In accordance with the present disclosure, FIG. 1 illustrates a latch or connector assembly 10. The connector assembly 10 includes a latch member 12 including a first arm 14 spaced from a second arm 16 in a generally U-shaped configuration. The latch member 12 is resilient so that the first arm 14 is configured to bias relative to the second arm 16. The latch member 12 includes a first or rear end 18 and an opposite second or front end 20. The first end 18 is configured to be inserted into a cooperating member such as a combination track and divider 22, termed cooperating member. The cooperating member 22 includes an elongated body 24 that defines a channel 26 that is configured to receive the first end 18 of the adapter 12. The channel 26 is defined between a pair of spaced rails 27A and 27B which extend upwardly from the elongated body 24, which can also be defined as a base. The rails 27A and 27B for a track for mounting a pusher assembly (not shown). The cooperating member 22 also includes a divider wall 28 that extends upwardly from the elongated body 24.

Figure 2:
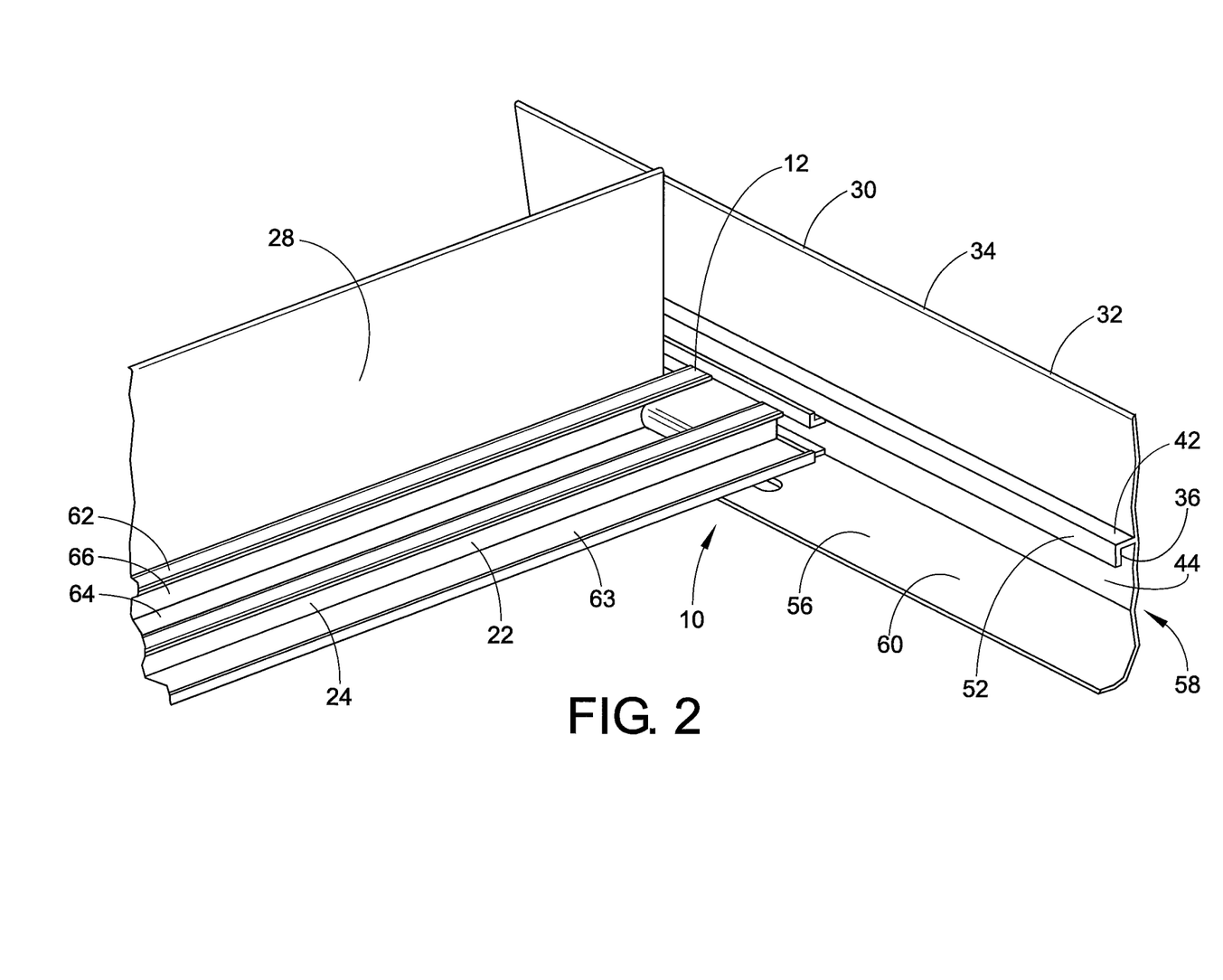
FIG. 2 is an enlarged perspective view of a portion of the latch assembly of FIG. 1.

As illustrated in FIGS. 1 and 2, the latch member 12 connects the cooperating member 22 to an elongated rail 30. The rail 30 includes a first or front side 32 that faces away from the cooperating member 22 and an opposite second or rear side 34 that faces toward the cooperating member 22. In one embodiment, the rail 30, track 22 and divider wall 28 can be made of a material such as a thermoplastic or polymer but can also be made from other materials such as metal alloys. The rail, track and divider wall can also comprise different colors or designs and can be made of a translucent material.

While the cooperating member 22 is illustrated as being a combination track and divider, it should be appreciated that the latch member 12 can be employed with simply a track not having a divider or simply a divider which does not have a track, as long as the divider is suitably configured to accommodate the latch member. For the sake of illustration, only the single cooperating member 22 is shown herein. But, it should be appreciated that there are other known types of cooperating members that are selectively secured to known rails.

The rail 30 includes an elongated member 36 that extends from the second side 34 and defines a space 38 between the rear surface 34 and a portion of the member 36. The elongated member 36, which defines a catch for cooperating with the latch member 12, extends along a lengthwise direction of the rail 30. The elongated member 36 includes a first portion 42 that is directly attached to the second side 34 of the rail 30 and a second portion 44 that depends from the first portion 42. The second portion 44 extends downwardly from the first portion 42 of the elongated member 36 and terminates at an edge 52 that extends lengthwise thereon. The edge 52 can be serrated and functions as the catch which cooperates with the latch member 12. The space 38 is defined by the first portion 42, the second portion 44 and the second side 34 of the rail 30 and is configured to selectively receive an attachment member 46 of the adapter 12.

The attachment member 46 is positioned on the second end 20 of the adapter 12 and extends from the first arm 14 in a transverse orientation. The attachment member 46 is adapted to snugly fit within the space 38 defined by the elongated member 36 and the second side 34 of the rail 30. The attachment member 46 includes a protrusion 48 that extends upwardly from the first arm 14 at the second end 20 of the adapter 12 and is oriented generally perpendicular to the first arm 14. The attachment member 46 and protrusion 48 extend in a widthwise direction relative to the first arm 14 such that the attachment member 46 extends from the first arm 14 in a generally 'T' shaped configuration. The protrusion 48 can include a generally tapered edge that allows the attachment member 46 to better fit within the space 38.

The attachment member 46 includes an abutment surface 50 that is positioned adjacent to the protrusion 48 along a top surface 54 of the first arm 14. The abutment surface 50 is configured to frictionally abut against the edge 52 of the elongated member 36 while the protrusion 48 is snugly positioned within the space 38. In this position, the adapter 12 securely connects the track 22 to the rail 30.

Figures 5, 6, 7:
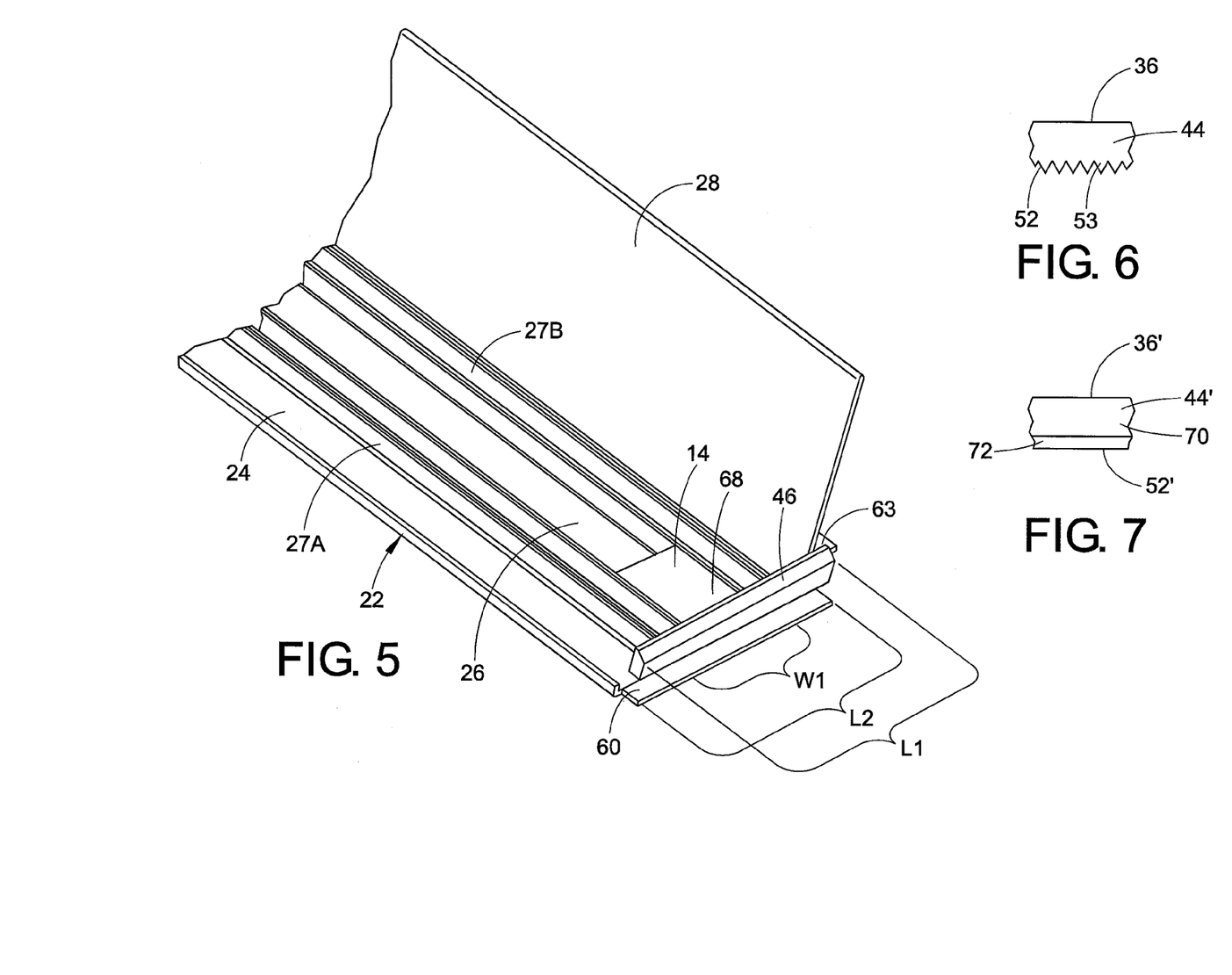
FIG. 5 is a perspective view of the combination track and divider of FIG. 4.
FIG. 6 is an enlarged rear elevational fragmentary view of a portion of the rail elongated member illustrating one embodiment of the edge thereof.
FIG. 7 is a rear elevational view of a portion of a portion of an elongated member of a rail illustrating another embodiment of the present disclosure.

In one embodiment, the elongated member 36 can include a plurality of spaced teeth 53 defined along the edge 52 and extend downwardly therefrom (see FIG. 6). In this embodiment, the abutment surface 50 can be made of a co-extruded material that is generally more flexible or resilient than the relatively more rigid material of the plurality of teeth positioned or defined along the edge 52. The abutment surface is configured to resiliently receive the plurality of teeth thereby securing the adapter 12 to the rail 30 in a friction fit.

With reference now to FIG. 7, according to another embodiment of the present disclosure, an elongated member 36' can include a second portion 44' that is made of two different coextruded materials. More specifically, a first more rigid coextruded material 70 constitutes the majority of the second portion 44'. However, along a distal edge 52' of the second portion 44' there is provided a more resilient flexible band of material 72. The coextruded material 72 on the edge 52' can be generally as flexible as, or more or less flexible than, the material of the cooperating portion of the latch member latching surface, against which it is compressed. In one embodiment, both the latch member surface and the cooperating surface of the rail can be coextruded.

This disclosure considers various combinations and orientations of how the abutment surface frictionally engages the edge 52, 52' and this disclosure is not limited thereto. For instance, the plurality of teeth 53 can optionally be located along the abutment surface 50 or the edge 52 and include various tapered orientations or materials.

The rail 30 includes a base surface 56 that extends from the second side 34 and is spaced from the elongated member 36. The base surface 56 assists to support the rail 30 along a shelf (not shown). The base surface 56 and the elongated member 36 define a channel 58 along the second side 34 of the rail 30 that is configured to receive the second end 20 of the adapter 12. The first arm 14 and second arm 16 of the adapter 12 are spaced from one another a predetermined distance such that the second arm 16 abuts the base surface 56 of the rail 30 while the attachment member 46 of the first arm 14 is engaged to the elongated member 36.

Figure 3:
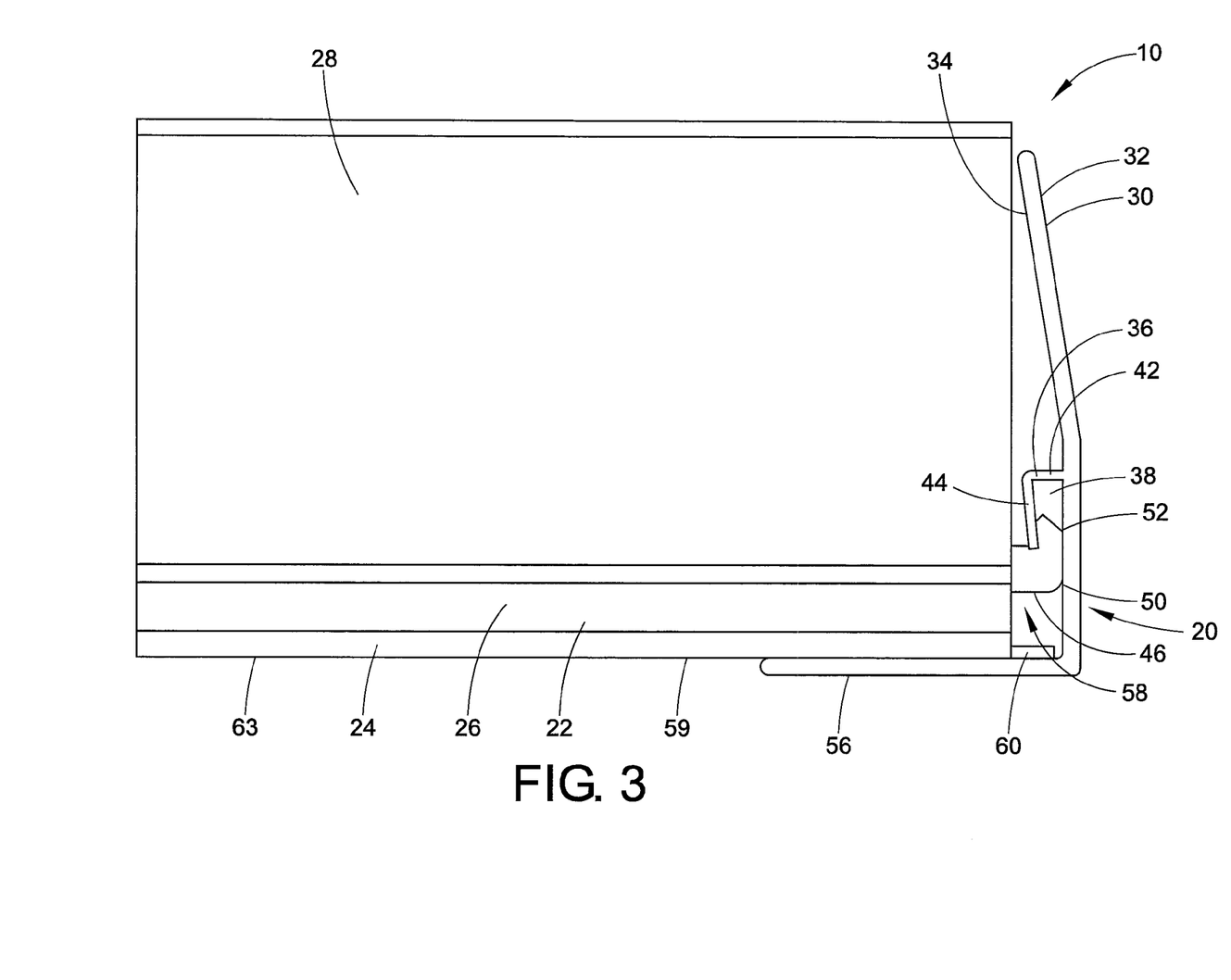
FIG. 3 is an enlarged side elevational view of a forward portion of the latch assembly of FIG. 1.

Additionally, as shown by FIG. 3, the elongated body 24 of the cooperating member 22 includes a bottom side 59 that can abut the base surface 56 when the cooperating member is attached to the rail 30. Optionally, as illustrated by FIGS. 2 and 5, a support wing 63 can extend from the bottom side 59 of the track 22 to maintain merchandise in an upright position.

Figure 4:
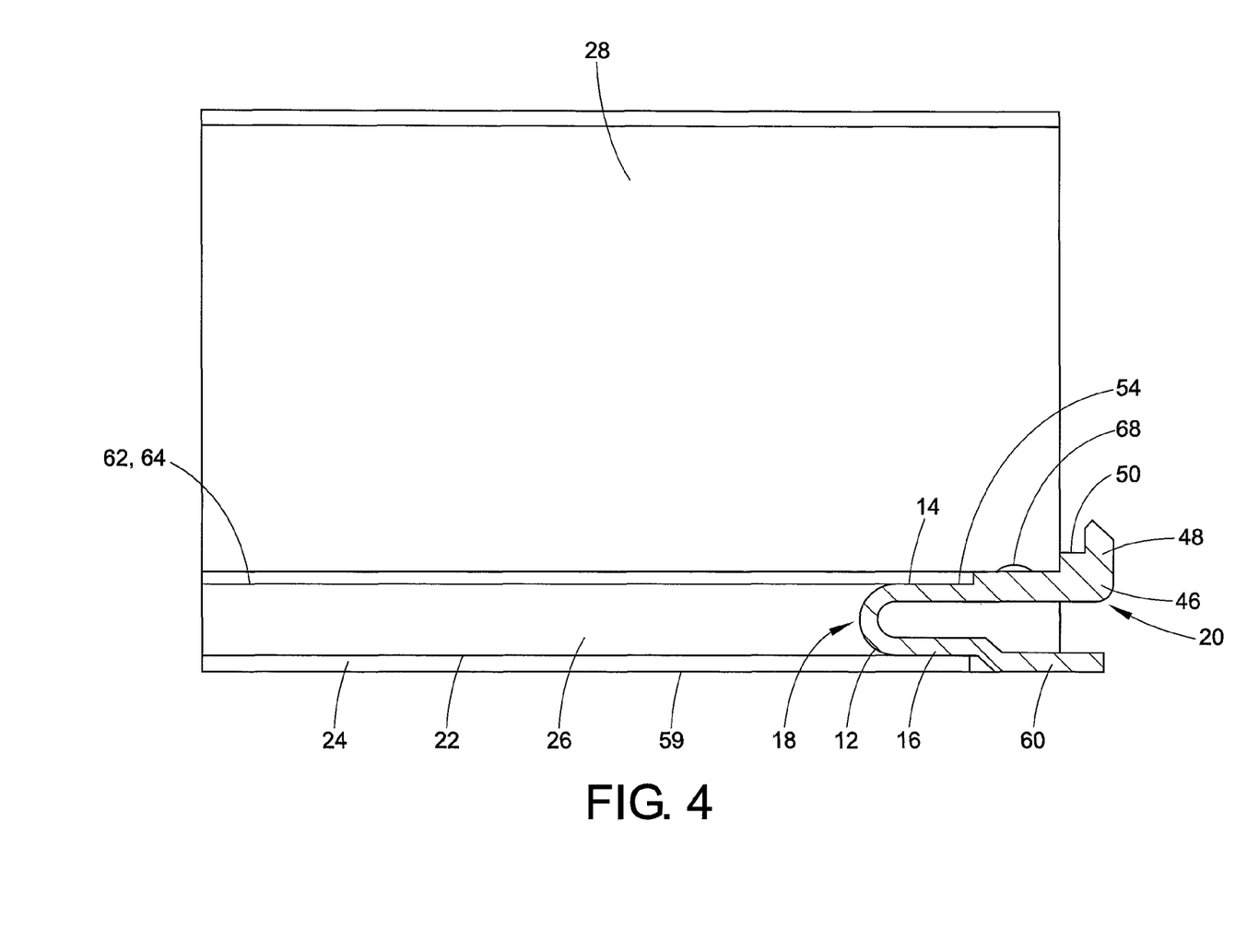
FIG. 4 is a cross sectional view of the combination track and divider of FIG. 1, when disconnected from the rail and illustrating a latch member according to the present disclosure.

FIG. 4 illustrates that the adapter 12 is received within the channel 26 of the track 22 and the second arm 16 rests on the bottom side 59 therein. The second arm 16 includes a base platform 60 that is configured to abut against the base surface 56 of the rail 30 as illustrated by FIGS. 1 and 3. In this embodiment, the base platform 60 can extend in a widthwise direction relative to the second arm 16 such that the base platform 60 extends from the second arm 14 in a generally 'T' shaped configuration. As illustrated by FIG. 5, in one embodiment, a length (L1) of the attachment member 46 can be approximately the same as a length (L2) of the base platform 60. The lengths L1 and L2 are greater than a width (W1) of the first and second arms 14, 16 of the adapter 12. This configuration provides structural stability to the connection assembly 10 as the track 22 is secured to the rail 30 in a generally transverse orientation. The 'T' shaped orientation of the adapter 12 provides stability to the track 22 as the divider wall 28 has increased ability to withstand side loads imposed thereon while maintaining an upward orientation. Additionally, unintended axial movement of the track 22 relative to the rail 30 is limited.

FIGS. 2 and 5 show the elongated body 24 of the track 22 includes the pair of spaced rails 27A and 27B and the channel 26 that extends in a lengthwise direction along the elongated body 24. The first arm 14 of the adapter 12 fits between and abuts against a bottom surface of the first and second rails 27A, 27B when the adapter 12 is received within the channel 26 of the track 22. The first arm 14 includes a press or contact surface 68 that is configured to be pressed by an associated user to bias the first arm 14 towards the second arm 16 to selectively disconnect the attachment member 46 of the latch member 12 from the edge 52 of the elongated member 36 along the rail 30. The press surface 68 is located along the top surface 54 of the first arm 14 and generally aligns within and is accessible through the channel 26.

In one embodiment, the latch member 12 is mounted to the cooperating member 22 simply by a friction fit. However, if desired, the latch member 12 can be attached within the channel 26 of the cooperating member 22 by conventional fasteners, adhesives, or by at least one pair of detents and recesses positioned along the second arm 16. The connection of the adapter 12 to the track 22 can be accomplished in various ways and this disclosure is not limited.

The described configuration of this connection assembly 10 allows the user to connect the cooperating member 22 to the rail 30. As the press surface 68 is pressed, the first arm 14 is moved towards the second arm 16 to position the attachment member 46 near the base platform 60 of the second arm 16. The second end 20 of the latch member 12 is then positioned adjacent to the second or rear side 34 of the rail 30 and inserted within the channel 58 defined by the elongated member 36 and the base surface 56. The base platform 60 and the bottom side 59 of the cooperating member 22 abut the base surface 56 of the rail 30. As the press surface 68 is released, the first arm 14 returns to its unflexed position and biases away from the second arm 16. It returns to a neutral position such that the protrusion 48 of the attachment member 46 is received within the space 38 defined by the elongated member 36 and second side 34 of the rail 30. The edge 52 of the elongated member 36 at least partially frictionally abuts the abutment surface 50 of the attachment member 46 along the first arm 14 thereby connecting the cooperating member 22 to the rail 30 in a transverse configuration.

Additionally, the user can press the press surface 68 of the adapter 12 to bias the first arm 14 towards the second arm 16 and disengage the edge 52 of the elongated member 36 from the abutment surface 50 while the second end 20 of the adapter 12 remains within the channel 58 of the rail 30. The cooperating member 22 and adapter 12 can then be moved axially relative to the rail 30 to adjust the position of the member along the shelf platform. This allows a merchant to rearrange the position of the cooperating member 22 without having to completely remove the cooperating member from the rail 30 or having to remove other cooperating members that are attached to the same rail.

Disclosed has been a latch or connector assembly that is adapted to attach a cooperating member to a rail along a merchandising shelf. The connector assembly includes an adapter having a first end and an opposite second end such that the first end is adapted to be attached to the track and the second end is configured to be selectively attached to the cooperating member. The adapter includes a first arm and a second arm, the first arm is spaced from a second arm such that the first arm can be resiliently biased relative to the second arm. An attachment member extends from the first arm and is configured to selectively connect to the rail. A press surface is configured to be pressed by an associated user to bias the first arm relative to the second arm to selectively connect the attachment member to the rail.

Also disclosed has been a connector assembly that is adapted to attach a track or a divider, or a combination track and divider, to a rail mounted to a merchandising shelf assembly. The merchandising shelf assembly comprises the shelf with the track/divider configured to be positioned along a front edge of the shelf, the rail having a first side adapted to be viewed by customers and an opposite second side with an elongated member such that the attachment member is configured to attach the track/divider along the second side of the rail.

The connector assembly includes an adapter having a first end and an opposite second end such that the first end is adapted to be attached to the track/divider and the second end is configured to be selectively attached to the rail. The adapter includes a first arm and a second arm, the first arm is spaced from a second arm such that the first arm can be resiliently biased relative to the second arm. A base platform extends from the second arm and is configured to abut the rail. An attachment member extends from the first arm and is configured to selectively connect to the rail.

Also disclosed has been a method for connecting a cooperating member to a rail on a shelf platform with an adapter. An adapter is attached within a channel of the cooperating member. The adapter includes a first arm spaced from a second arm wherein the first arm is configured to bias relative to the second arm and an attachment member extends from an end of the first arm. The first arm is normally biased away from the second arm. The adapter and track are positioned on the shelf adjacent to a rear side of the rail such that the attachment member extending from the first arm is aligned with an elongated member extending from the rear side of the rail. The first arm is pushed towards the second arm to disengage the attachment member from the rail. When released, an edge of the elongated member is again frictionally abutted by an abutment surface of the first arm.

It should be appreciate that the cooperating member 12 and the rail 30 can be made of different materials, as can the latch member 12. For example, the rail 30 can be made of a suitable metallic material, whereas the latch member 12 is made of a first type of thermoplastic material while the cooperating member 22 is made of a second type of thermoplastic material. Alternatively, both the cooperating member 22 and the rail 30 can be made of a first type of thermoplastic material, while the latch member is made of a second type of thermoplastic material. In addition, both the rail 30 and the latch member 12 can be made of coextruded thermoplastic materials having different material properties on various surfaces of the latch member and the rail.

The exemplary embodiments of the disclosure have been described herein. Obviously, modifications and alterations will occur to others upon reading and understanding the preceding detailed description. It is intended that the instant disclosure be construed as including all such modifications and alterations insofar as they come within the scope of the appended claims or the equivalents thereof.

The invention claimed is:

1. A connector assembly that is adapted to selectively attach a cooperating member to a rail wherein the cooperating member and the rail are supported by an associated merchandising shelf, the connector assembly comprising:
    an adapter including a first end and an opposite second end such that the first end is adapted to be attached to the cooperating member and the second end is configured to be selectively attached to the rail, the adapter including a first arm and a second arm, the first arm being spaced from a second arm such that the first arm is movable in relation to the second arm;
    an attachment member extending from the first arm and being configured to selectively connect to the rail, wherein in use the attachment member extends in a vertical plane;
    a press surface defined on the first arm and configured to be pressed by an associated user to urge the first arm toward the second arm; and
    wherein the first and second arms are each planar and wherein the adapter is made of a resilient material such that in use the first arm extends in a first horizontal plane oriented parallel to a second horizontal plane in which the second arm extends when the press surface is not engaged.

2. The connector assembly according to claim 1 wherein the adapter is a unitary body such that the first arm and second arm together define a generally U-shaped configuration.

3. The connector assembly according to claim 1 wherein the attachment member includes a hook member that extends upwardly from the first arm.

4. The connector assembly according to claim 1 wherein the attachment member includes an abutment surface positioned between the hook member and the press surface that is configured to frictionally abut an edge of the elongated member of the rail when the adapter is attached to the rail.

5. The connector assembly according to claim 4 wherein the abutment surface is at least partially made from a material that is co-extruded with a material of the adapter.

6. The connector assembly of claim 4 wherein the abutment surface is located in a plane spaced from the plane of the first arm.

7. The connector assembly of claim 4 wherein the press surface is spaced from the hook member by the abutment surface.

8. The connector assembly of claim 1 wherein the second arm includes a first portion and a second portion comprising a base section that extends in a plane spaced from a plane in which a first portion of the second arm extends.

9. A connector assembly that is adapted to selectively attach a cooperating member to a rail wherein the cooperating member and the rail are supported by an associated merchandising shelf, the connector assembly being of one-piece and comprising:
    a U-shaped adapter including a first end and an opposite second end such that the first end is adapted to be selectively attached to the cooperating member and the second end is adapted to be selectively attached to the rail, the adapter including a first arm and a second arm, wherein the adapter comprises a resilient material and wherein the first arm is spaced from a second arm such that the first arm is movable in relation to the second arm wherein the U-shaped adapter has a first width;
    an attachment member extending upwardly in a direction generally perpendicular to a plane of the first arm, the attachment member being configured to selectively cooperate with the rail wherein the attachment member has a second width and wherein the second width is greater than the first width and wherein the attachment member protrudes from opposing side edges of the first arm; and
    a press surface defined on the adapter and configured to be contacted by an associated user so as to urge the first arm toward the second arm.

10. The connector assembly of claim 9 wherein the second arm includes a first portion and a second portion comprising a base section that extends in a plane spaced from a plane in which the first portion of the second arm extends.

11. The connector assembly of claim 9 wherein the adapter further comprises a link portion which joins the first arm to the second arm.

12. The connector assembly of claim 9 further comprising a base platform extending from the second arm.

13. The connector assembly of claim 12 wherein the base platform has a width which is greater than the first width.

14. The connector assembly of claim 9 wherein the U-shaped adapter first and second arms are each rectangular in cross-section.

15. The connector assembly of claim 9 wherein the U-shaped adapter further comprises an abutment surface positioned between the attachment member and the press surface.

16. The connector assembly of claim 9 wherein the attachment member is wider than the press surface.

\* \* \* \* \*